US007803599B2

(12) United States Patent
Lutz et al.

(10) Patent No.: US 7,803,599 B2
(45) Date of Patent: Sep. 28, 2010

(54) STEADY STREAMING PARTICLE TRAPS

(75) Inventors: Barry R. Lutz, Seattle, WA (US); Daniel T. Schwartz, Seattle, WA (US)

(73) Assignee: University of Washington, Seattle, WA (US)

( * ) Notice: Subject to any disclaimer, the term of this patent is extended or adjusted under 35 U.S.C. 154(b) by 304 days.

(21) Appl. No.: 11/038,454

(22) Filed: Jan. 18, 2005

(65) Prior Publication Data

US 2005/0194314 A1    Sep. 8, 2005

Related U.S. Application Data

(60) Provisional application No. 60/537,735, filed on Jan. 16, 2004.

(51) Int. Cl.
*C12N 1/00* (2006.01)
*B01D 11/04* (2006.01)

(52) U.S. Cl. .................. 435/243; 210/322; 210/634

(58) Field of Classification Search .............. 435/173.1, 435/173.9, 288.2, 287.6, 243; 311/155; 210/634, 210/322
See application file for complete search history.

(56) References Cited

U.S. PATENT DOCUMENTS

| 5,209,438 | A | * | 5/1993 | Wygnanski | ................. | 244/203 |
| 6,568,052 | B1 | | 5/2003 | Rife et al. | | |
| 6,681,616 | B2 | | 1/2004 | Spaid et al. | | |

OTHER PUBLICATIONS

Lutz, B.R., et al., "Microfluidics Without Microfabrication," *PNAS* 100(8):4395-4398, Apr. 15, 2003.
Marmottant, P., and Hilgenfeldt, S., "Controlled Vesicle Deformation and Lysis by Single Oscillating Bubbles," *Nature* 423:153-156, May 2003.
Riley, N., "Steady Streaming," *Annu. Rev. Fluid Mech. 2001* 33:43-65, Jan. 2001.
Alassar, R.S., and H.M. Badr, "Oscillating Flow Over Oblate Spheroids," Acta Mechanica 137(3-4):237-254, 1999.
Alassar, R.S., and H.M. Badr, "Oscillating Viscous Flow Over a Sphere," Computers & Fluids 26(7):661-682, 1997.
Amin, N., and N. Riley, "Streaming From a Sphere Due to a Pulsating Source," Journal of Fluid Mechanics 210(1):459-473, 1990.
Badr, H.M., "Oscillating Inviscid Flow Over Elliptic Cylinders With Flat Plates and Circular Cylinders as Special Cases," Ocean Engineering 21(1):105-113, 1994.
Badr, H.M., "Oscillating Viscous Flow Over an Inclined Elliptic Cylinder," Ocean Engineering 21(4):401-426, 1994.
Badr, H.M., et al., "Viscous Oscillatory Flow About a Circular Cylinder at Small to Moderate Strouhal Number," Journal of Fluid Mechanics 303(1):215-232, 1995.
Bertelsen, A., et al., "Nonlinear Streaming Effects Associated With Oscillating Cylinders," Journal of Fluid Mechanics 59(3):493-511, 1973.

Davidson, B.J., and N. Riley, "Cavitation Microstreaming," Journal of Sound Vibrations 15(2):217-233, Mar. 1971.
Elder, S.A., "Cavitation Microstreaming," Journal of the Acoustical Society of America 31(1):54-64, Jan. 1959.
Goldberg, I.S., et al., "Steady Streaming of Fluid in the Entrance Region of a Tube During Oscillatory Flow," Physics of Fluids 11(10):2957-2962, Oct. 1999.
Gopinath, A., and A.F. Mills, "Convective Heat Transfer From a Sphere Due to Acoustic Streaming," Journal of Heat Transfer 115(2):332-341, May 1993.
Holtsmark, J., et al., "Boundary Layer Flow Near a Cylindrical Obstacle in an Oscillating, Incompressible Fluid," Journal of the Acoustical Society of America 26(1):26-39, Jan. 1954.
Ingham, D.B., and B. Yan, "Fluid Flows Around Cascades," Journal of Applied Mathematics & Physics (ZAMP) 44(1):53-72, Jan. 1993.
Kim, S.K., and A.W. Troesch, "Streaming Flows Generated by High-Frequency Small-Amplitude Oscillations of Arbitrarily Shaped Cylinders," Physical Fluids A 1(6):976-985, Jun. 1989.
Kotas, C.W., et al., "Visualization of Steady Streaming Near Oscillating Spheroids," Experiments in Fluids 42(1):111-121, Jan. 2007.
Lane, C.A., "Acoustical Streaming in the Vicinity of a Sphere," Journal of the Acoustical Society of America 27(6):1082-1086, Nov. 1955.
Lim, T.G., and J.M. Hyun, "Flow Driven By a Torsionally-Oscillating Shrouded Endwall Disk," Journal of Fluids Engineering 119(1):115-121, Mar. 1997.
Lutz, B.R., et al., "Characterizing Homogeneous Chemistry Using Well-Mixing Microeddies," Analytical Chemistry 78(5):1606-1612, Mar. 2006.
Lutz, B.R., et al., "Microscopic Steady Streaming Eddies Created Around Short Cylinders in a Channel: Flow Visualization and Stokes Layer Scaling," Physics of Fluids 17(2):023601-1-023601-7, 2005.
Lyne, W.H., "Unsteady Viscous Flow in a Curved Pipe," Journal of Fluid Mechanics 45(1):13-31, 1970.
Nilson, R.H., and S.K. Griffiths, "Enhanced Transport by Acoustic Streaming in Deep Trench-Like Cavities," Journal of The Electrochemical Society 149(4):G286-G296, Apr. 2002.
Nishimura, T., and Y. Kawamura, "Three-Dimensionality of Oscillatory Flow in a Two-Dimensional Symmetric Sinusoidal Wavy-Walled Channel," Experimental Thermal and Fluid Science 10(1):62-73, Jan. 1995.

(Continued)

*Primary Examiner*—Sandra Saucier
*Assistant Examiner*—Susan Hanley
(74) *Attorney, Agent, or Firm*—Christensen O'Connor Johnson Kindness PLLC (57) ABSTRACT

A microfluidic fluid flow system (100) is disclosed having a fluid chamber or channel (150) with inlet and outlet ports (104, 106), allowing the fluid channel to be filled with a fluid. One or more flow obstructions or perturbances, such as cylinders (152), are provided in the channel. An oscillatory boundary condition is applied, for example, with a piezoelectric driver (130), that is selected to induce a conservative, low-intensity steady streaming flow in the channel. The low-intensity streaming flow produces distinct eddies that can be utilized, for example, for fluid-dynamically trapping or retaining particles (90) such as cells (92) at well defined locations in the channel. The system may be used to trap and study individual cells or for concentrating or filtering particles in a fluid.

30 Claims, 6 Drawing Sheets

OTHER PUBLICATIONS

Petit, L., and P. Gondret, "Redressement d'un Écoulement Alternatif," Journal de Physique II France 2(12):2115-2144, Dec. 1992.

Raney, W.P., et al., "Acoustical Streaming in the Vicinity of a Cylinder," Journal of the Acoustical Society of America 26(6):1006-1014, Nov. 1954.

Riley, N., "Acoustic Streaming," Theoretical and Computational Fluid Dynamics 10(1-4):349-356, 1998.

Riley, N., "On a Sphere Oscillating in a Viscous Fluid," Quarterly Journal of Mechanical and Applied Mathematics 19(4):461-472, 1966.

Riley, N., and M.F. Wybrow, "The Flow Induced by the Torsional Oscillations of an Elliptic Cylinder," Journal of Fluid Mechanics 290:279-298, 1995.

Skavlem, S., and S. Tjötta, "Steady Rotational Flow of an Incompressible, Viscous Fluid Enclosed Between Two Coaxial Cylinders," Journal of the Acoustical Society of America 27(1):26-33, Jan. 1955.

Sobey, I.J., "On Flow Through Furrowed Channels. Part 1. Calculated Flow Patterns," Journal of Fluid Mechanics 96(1):1-26, 1980.

Waters, S.L., and T.J. Pedley, "Oscillatory Flow in a Tube of Time-Dependent Curvature. Part 1. Perturbation to Flow in a Stationary Curved Tube," Journal of Fluid Mechanics 383(1):327-352, Mar. 1999.

Wybrow, M.F., et al., "Oscillatory Flow Over a Circular Cylinder Close to a Plane Boundary," Fluid Dynamics Research 18:269-288, Oct. 1996.

Yan, B., et al., "The Streaming Flow Initiated by Oscillating Cascades of Cylinders and Their Stability," Physical Fluids 6(4):1472-1481, Apr. 1994.

* cited by examiner

STEADY STREAMING PARTICLE TRAPS

CROSS-REFERENCE TO RELATED APPLICATION

This application claims the benefit of Provisional Application No. 60/537,735, filed Jan. 16, 2004, the benefit of which is hereby claimed under 35 U.S.C. §119.

STATEMENT OF GOVERNMENT LICENSE RIGHTS

This invention was made with U.S. Government support under Grant No. 9872385 awarded by the National Science Foundation (NSF). The U.S. Government has certain rights in the invention.

FIELD OF THE INVENTION

The present invention is in the field of microfluidics and, more particularly, directed to apparatus and methods for generating and utilizing eddies formed by low-intensity steady streaming.

BACKGROUND OF THE INVENTION

Microfluidic applications generally seek to control fluids, reagents, and objects at the microscale. The development of individual components to either mimic traditional processes or to realize novel processes remains important to development in the field.

Chemical production, sample analyses, and chemical research have historically been based on laboratory-scale or plant-scale systems. In the early 1990s, microfabrication methods were borrowed from the microelectronics industry to create small channels that could serve as tiny chemical reactors or laboratories. This new approach spawned the field of microfluidics, which has become associated with all means of controlling fluid and its contents at the microscale. The ability to replicate traditional systems at the microscale remains an important goal. On the other hand, the small length scale also allows creation of novel systems. Recent developments in microfluidics have demonstrated sub-millimeter microreactors for chemical production and microscale analytical systems, as well as systems for direct manipulation of cells. Much current effort is spent demonstrating and developing individual components for controlling fluids, reagents, and objects at the microscale, either to mimic traditional processes or to realize new processes.

The small length scale of microfluidic devices has important consequences for flow, transport, and reaction. While it is intuitive that objects in a fluid stream will move in the direction of flow, other fluid-dynamic forces generated by velocity gradients in a flow field are known to move objects across streamlines. For example, the well-known "tubular pinch effect" describes the movement of blood cells to specific annular positions within blood vessels, and inertial migration in channel flow has been exploited to concentrate cells and to perform size-based particle and cell separations.

Recirculating flows in microfluidic systems offer a fundamentally different means of controlling fluids, reagents, and objects. In some flows, small laminar eddies form that can perform the final mixing of reagents so important for chemical reactions, and the extent of mixing in these eddies can affect many performance parameters, such as yield and selectivity. Such eddies are also known to affect other related parameters, such as sedimentation and entrainment of small objects. For example, small laminar eddies formed in turbulence have been implicated in plankton blooms due to the differential effect on predator and the blooming prey.

It is known that oscillating a fluid, for example, at audible frequencies, can generate a streaming flow within the fluid, even in the absence of a net flow. Two distinct types of streaming flows are known high-intensity streaming and low-intensity streaming. These two types of streaming flows result from different physical mechanisms. High-intensity steady streaming is driven by body forces generated throughout the fluid (e.g., "quartz wind") and is a nonconservative effect resulting from the absorption of acoustic energy by the fluid, which may cause significant heat generation. Low-intensity steady streaming, by contrast, is a conservative effect driven locally from within boundary layers, and typically involves fluid recirculation. The term acoustic streaming is often used to describe both types of streaming, but steady streaming is a more appropriate term for low-intensity streaming.

Low-intensity steady streaming provides a method for creating eddies in a fluid. The characteristics of the recirculating eddies, such as the eddy strength, size, and location, can be predictably achieved by the appropriate selection of geometry, oscillation parameters and fluid properties. Recirculating eddies generated by low-intensity steady streaming are distinctly different from flow patterns in typical microfluidic devices, leading to fundamentally different reagent mixing and a unique ability to trap microscopic objects at fixed locations. The present invention focuses on the use of low-intensity steady streaming to produce small eddies that can be utilized, for example, as relatively simple and gentle traps for small objects, including motile cells.

In particular, the present invention is directed to generating low-intensity streaming flows in a microfluidic channel or chamber to create eddies, and utilizing the properties of such microfluidic flow streams for controlling fluids, reagents, and objects at the microscale. For example, it is often desirable to study single cells in an environment that is compatible with the cell and without damaging or otherwise modifying the cell. Similarly, it may be desirable to trap specific cells or other particles for purposes of either concentrating or filtering such particles from a fluid.

Conventional methods for trapping single cells include, for example, optical tweezers or laser traps that utilize focused laser radiation to manipulate the cells. Such systems, however, have several drawbacks. For example, conventional trapping systems may produce undesirably high forces and/or thermal stresses on the cell and may not be suitable for cells that are light- and/or heat-sensitive. Another method utilizes dielectrophoretic traps that apply an electric field to create trapping forces. Such systems, however, generally polarize the cell membrane and may therefore alter the behavior of the cell. Moreover, such trapping systems must typically be designed to target a specific cell and cell medium, and are not easily modified to target a different cell.

There remains a need, therefore, for improved methods of trapping particles and/or cells from a fluid medium.

SUMMARY OF THE INVENTION

A method and apparatus are disclosed that utilize low-intensity steady streaming in a microfluidic device to generate eddies positioned at well-defined positions within a channel. The eddies define regions of flow that are relatively separate from the surrounding flow field. The eddies have been found to provide a fluid-dynamic trapping force that is suitable for retaining particles, including motile and non-motile cells, that are in the fluid.

In an embodiment of the invention, a method for fluid-dynamically trapping particles is disclosed wherein a channel containing a flow obstruction is filled with a fluid containing a plurality of particles. An oscillating boundary condition is applied to the fluid at a frequency and an amplitude that generates a low-intensity steady streaming in the flow, such that eddies are generated therein. Low-intensity steady streaming refers to a time-averaged steady flow generated by fluid oscillation and does not rely on compression of the fluid. Oscillation frequencies approximately within the audible range and below the audible range are typically appropriate for aqueous fluids.

In a particular embodiment of the invention, the flow obstruction is a cylinder that is disposed away from the sidewalls of the fluid channel.

In another particular embodiment of the invention, the channel includes an inlet port and an outlet port, and there is a net fluid flow through the channel.

In an embodiment of the invention, the particles in the fluid are motile cells.

In an embodiment of the invention, the particles contained in the fluid are denser than the fluid.

In an embodiment of the invention, the steady streaming produces eddies that are two-dimensional in character and that produce a trapping force that is less than about 50 pN.

In an embodiment of the invention, the channel includes a plurality of right circular cylindrical flow obstructions, each flow obstruction being associated with at least one eddy.

In another particular embodiment of the invention, a filter for removing particles from a fluid stream is provided, the filter defining a fluid channel having an inlet port, an outlet port, and a movable boundary. A plurality of obstructions is disposed in the fluid channel between the inlet port and the outlet port. An oscillatory driver, such as a piezoelectric driver, engages the fluid channel through the movable boundary. A fluid stream containing a plurality of particles enters the channel through the inlet port and exits the channel through the outlet port and the oscillatory driver oscillates the fluid stream to generate a low-intensity steady streaming flow in the fluid stream that includes a plurality of eddies at fixed positions in the fluid channel.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A detailed description of the generation of microfluidic eddies using low-intensity steady streaming and the use of such eddies in various applications such as microfluidic mixing and fluid dynamically trapping particles, including cells and even motile cells such as phytoplankton, is disclosed in the related Provisional Application No. 60/537,735, filed Jan. 16, 2004, which is hereby incorporated by reference in its entirety.

Microfluidic systems have a common need to control fluids. Typical systems may also control reagents, proteins, cells, or other objects carried by the fluid. Microfluidic systems conventionally include at least one characteristic dimension that is smaller than about 1 mm, and therefore the associated flow is most typically laminar in character. Such laminar flow systems allow controlled and predictable organization of fluids. Microscale steady streaming eddies created using low-intensity sound waves offer appealing options for controlling fluids in microfluidic systems. We describe below the three-dimensional steady streaming flow generated in a microfluidic chamber or channel containing a flow obstacle or obstruction such as a fixed cylinder, wall contour, or curved flow path, when the channel fluid is oscillated at a low intensity. Low-intensity steady streaming is a conservative effect driven locally from within boundary layers and typically involves fluid recirculation. In particular, low-intensity steady streaming is to be distinguished from high-intensity streaming, which is driven by body forces generated throughout the fluid (typically generating "quartz wind") and is a nonconservative effect resulting from the absorption of acoustic energy by the fluid.

Low-intensity steady streaming offers an appealing alternative to controlling fluids in microscale devices without the need for net fluid flow, although in some applications it is desirable to include a net fluid flow in combination with low-intensity steady streaming. Recently, steady streaming has found limited use in microscale fluid devices. High-intensity steady streaming driven by acoustic attenuation within bulk fluids has been used to pump fluids, mix microchambers, and organize particles. In contrast, low-intensity steady streaming is driven by Reynolds stresses generated by boundary layers formed near solid boundaries in oscillating flow.

The overall convection generated by low-intensity steady streaming has been used to mix small fluid chambers. Distinct microscopic steady streaming eddies formed in a macroscopic device can serve as hydrodynamic reagent containers and reaction vessels. The ability to generate microscale steady streaming eddies in small channels provides a route to integration of this unique flow as a component for microfluidic systems.

Although for clarity we describe herein a specific embodiment of a fluidic device for generating three-dimensional, low-intensity steady streaming eddies formed around a cylinder in a channel, it is known and contemplated by the present invention that eddies may be formed through low-intensity streaming using other types of flow obstructions, including, for example, different-shaped bodies in the flow stream, contoured channel walls (such as walls having bumps or cavities), and/or curved channels. It is known that no steady streaming occurs in rectilinear flow of a featureless channel due to the absence of inertial terms, but the addition of geometry that requires the fluid to turn (e.g., bluff body, cavity, bend) can generate time-averaged Reynolds stresses that drive steady streaming. The distinct microscale eddies generated by low-intensity streaming provide an appealing mechanism for controlling reagents and microscale objects in microfluidic devices.

It is known that the applying low-intensity fluid oscillations in a fluid having a stationary right circular cylinder disposed therein can produce a steady streaming flow in which four symmetric eddies form adjacent to the cylinder. The two-dimensional theory for such flows models the geometry as an infinitely long cylinder of radius a surrounded by a concentric outer cylinder of radius A. The flow is driven by a planar oscillation with frequency $\omega$ and displacement amplitude s. The key dimensionless parameters are the dimensionless oscillation amplitude, $\epsilon = s/a$, and dimensionless oscillation frequency, $M^2 = a^2\omega/\nu$, where $\nu$ is the fluid kinematic viscosity. An analytic solution of such a flow field typically relies on a regular perturbation for small amplitude (i.e., $\epsilon \ll 1$), which allows separation of the unsteady and steady flow components and truncation of higher order harmonics. Solution of the unsteady flow equations provides Reynolds stresses that drive the steady streaming flow. For a given geometry, the eddy size is a function only of M, and $\epsilon$ appears as a multiplier that scales the flow speed. Large oscillation amplitudes (e.g., $\epsilon$ greater than about 0.1) are known to decrease the eddy size.

At small amplitude, moderate values of M lead to distinct eddies adjacent to the cylinder that are substantially separated from the outer fluid by a concentric dividing streamline. The velocity field is described by analytical expressions for the steady flow component that may be used to determine the location of the dividing streamline, and thus the eddy size. A more detailed analysis of the corresponding three-dimensional flow field retains some quantitative character of the two-dimensional streaming for low amplitude and moderate M. The two-dimensional flow field detailed above is referred to herein as the "2-D description."

Figure 1:
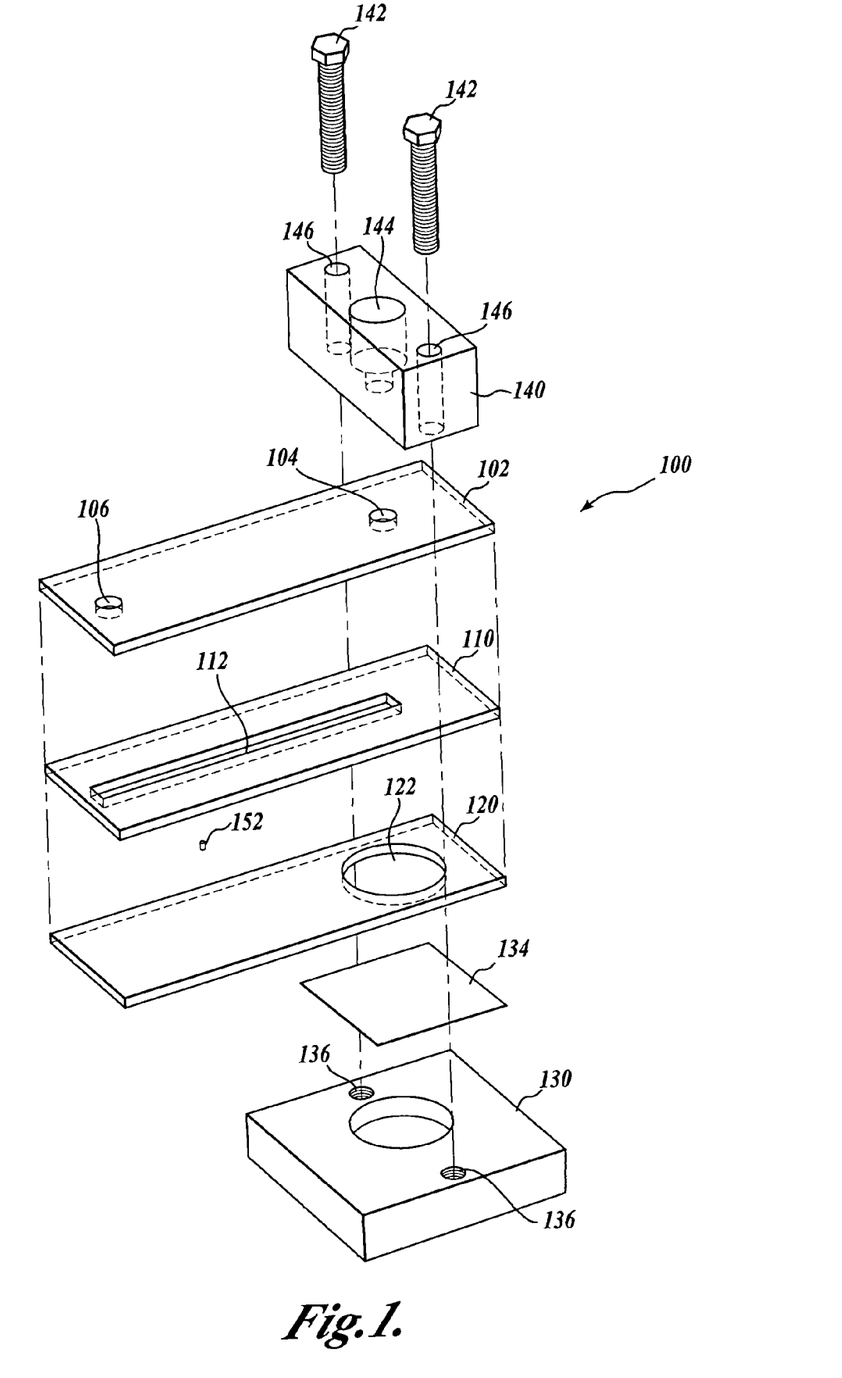
FIG. 1 is an exploded view of an exemplary microfluidic flow system for generating low-intensity streaming flow, in accordance with the present invention.
Figure 2:
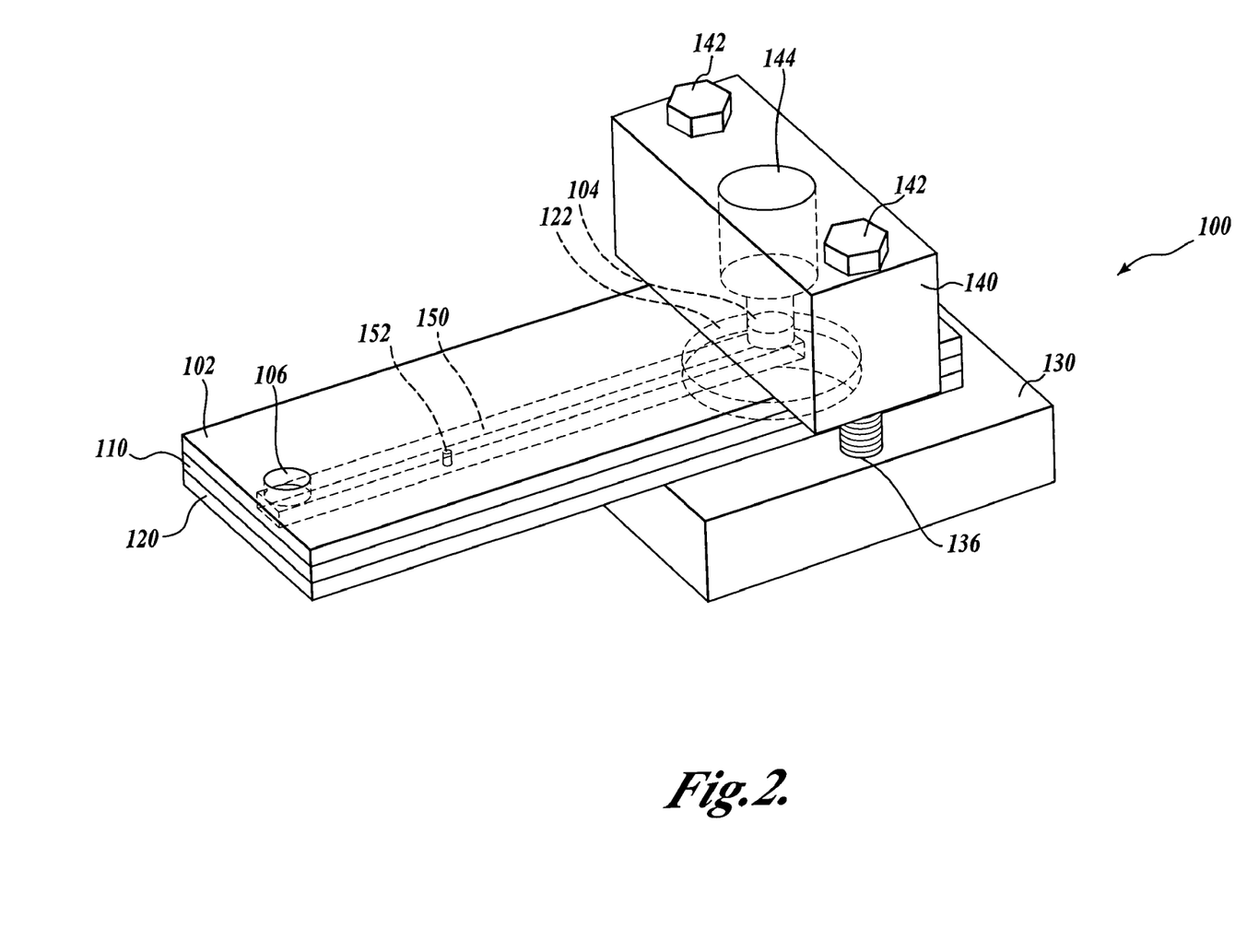
FIG. 2 is an assembled view of the microfluidic flow system shown in FIG. 1.

For characterization of steady streaming in a channel, specific flow systems were used. Referring now to FIGS. 1 and 2, a microfluidic flow system 100 is described that generates a low-intensity steady streaming field in a fluid. FIG. 1 shows an exploded view of the flow system 100 and FIG. 2 shows the assembled flow system 100. A fluid channel 150 is formed by joining an upper capping layer 102, middle layer 110, and lower capping layer 120. The upper capping layer 102 has a fluid inlet port 104 and an outlet port 106. The middle layer 110 disposed below the upper capping layer 102 includes an elongate slot 112 that is positioned to underlie the fluid ports 104 and 106. The lower capping layer 120 underlies the middle layer 110 and includes an aperture 122 positioned below one end of the elongate slot 112. A piezoelectric driver assembly 130 provides a controllable oscillatory boundary (amplitude and frequency) to the fluid aperture 122 through a flexible diaphragm 134 disposed therebetween.

An inlet coupling block 140 is positioned over the upper capping layer 102 and includes apertures 146 that are aligned with threaded apertures 136 in the piezoelectric driver assembly 130 such that the assembly defined by the upper capping layer 102, middle layer 110, and lower capping layer 120 may be clamped between the piezoelectric driver assembly 130 and the coupling block 140, wherein the clamping force to create a seal is provided by threaded members 142. An inlet aperture 144 is also provided through the coupling block 140, positioned to overlie the fluid inlet port 104 such that the fluid channel 150 is readily fillable with a working fluid.

A small right circular cylinder 152 is disposed generally along the centerline of the fluid channel 150 and oriented perpendicular to the longitudinal direction of the fluid channel 150. The cylinder 152 spans the height of the channel 150, i.e., extends from the upper capping layer 102 to the lower capping layer 120. In the experimental assembly, the upper capping layer 102, middle layer 110, and lower capping layer 120 are formed from 1.5 mm thick acrylic sheets. The fluid channel 150 (defined by the elongate slot 112) has a width of about 4 mm and the aperture 122 is about 1 cm in diameter. The cylinder 152 is sized to fit within the channel height and the cylinder 152 ends are attached to the capping layers 102, 120 using epoxy. The three acrylic layers 102, 110, and 120 are joined by wetting the joints with methylene chloride (an acrylic solvent) to form the fluid channel 150.

The inlet aperture 144 in the inlet coupling block 140 provides a means for coupling a syringe (not shown) to the fluid port 104 to allow channel loading and flushing. The piezoelectric driver assembly 130 is water filled and coupled to the aperture 122 through the thin polymer diaphragm 134. The impedance of the inlet coupling block 140 and syringe is sufficient to prevent damping of the oscillation within the fluid channel 150. The outlet fluid port 106 was simply left open to receive oscillations and allow flushing of the fluid channel 150.

Three flow systems, or flow cells, 100 were constructed using different radii cylinders 152, cylinders of radii a=125, 250, and 500 μm. The rectangular fluid channels 150 in all fluid cells 100 have a height of 1.5 mm (2h), a width of 4 mm (2w), and a length of 3.5 cm. The cylinder 152 in each flow cell is located 1.5 cm from the fluid channel 150 distal end. To identify the structure and scaling of steady streaming flow features, experiments were conducted utilizing low-intensity oscillation of the channel fluid without net flow. The piezoelectric diaphragm (not shown) in the piezoelectric driver assembly 130 was driven with a sine wave from a function generator and audio amplifier. Oscillation frequencies ranged from 40 Hz-1,000 Hz and oscillation amplitudes were limited to $\epsilon \leq 0.1$ to approximate the low amplitude assumption used in the theoretical description. All experiments used water at room temperature ($\nu = 0.0095$ cm$^2$/s).

Figure 3:
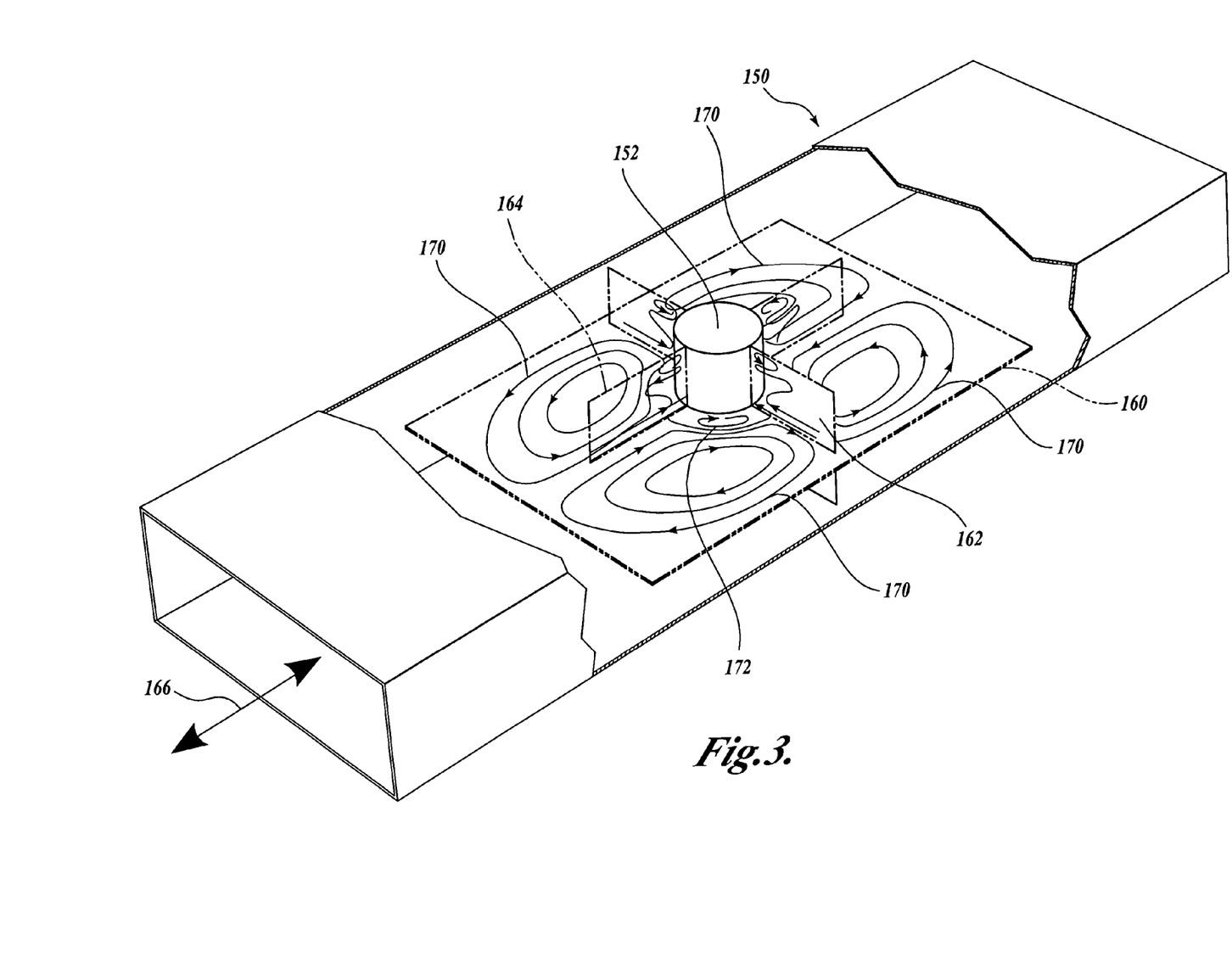
FIG. 3 is a partially cutaway view of the fluid channel shown in FIG. 1, and showing orthogonal mid-planes intersecting the cylinder axis.

FIG. 3 shows diagramatically a portion of the fluid channel 150 near the cylinder 152 (with the related structure removed for clarity) and three orthogonal flow cross-section midplanes 160, 162, 164 through the axis of the cylinder 152 that were imaged in experiments. The rectangular fluid channel 150 extends longitudinally in both directions from the cylinder 152, generally along the direction of the imposed fluid oscillations, which is indicated by arrow 166. Each cross-section mid-plane 160, 162, 164 represents a flow symmetry plane that was selectively illuminated through the transparent flow system walls using a laser (SDL-8630, 668 nm, not shown) focused to a sheet by a cylindrical lens (f=10 inch, not shown). More details regarding the experimental setup and the flow imaging methodology are provided in the parent provisional application, which has been incorporated by reference above.

Also shown in FIG. 3 are representative streamlines for low-intensity steady streaming that was induced in the fluid on the horizontal mid-plane 160. Four symmetrically disposed far-field eddies 170 and four smaller, symmetrically disposed near-field eddies 172 (one visible in FIG. 3) are generated by the low-intensity streaming near the cylinder 152. The observed flow field along the horizontal mid-plane 160 is in good agreement with theoretical, analytical, two-dimensional calculations for the low-intensity steady streaming flow.

The familiar 2-D eddies 170, 172 are generated at the horizontal mid-plane 160, i.e., far from the channel walls. Near the cylinder ends, however, the boundary layers formed at the cylinder 152 and the channel walls merge and three-dimensional flow is expected within the boundary layer junction. The boundary layers formed near the channel walls during oscillation participate in steady streaming around the cylinder 152. The three-dimensional streaming can be characterized by imaging the vertical flow symmetry planes 162 and 164 along the length of the cylinder 152.

It has been found that in the channel near the cylinder 152, but away from the horizontal mid-plane 160, the low-intensity streaming flow is not a simple decay of the 2-D eddy flow, but rather a distinguishable organized 3-D streaming occupies a portion of the fluid channel 150. In particular, in the transverse vertical mid-plane 162, the enclosed eddies rotate in-plane, with fluid drawn toward the cylinder 152 along the channel walls. In the longitudinal vertical mid-plane 164, a flow with opposite rotation ejects fluid outward along the channel wall, but an enclosed eddy does not form. The regions occupied by the 2-D eddy and 3-D flow are consistent between the two plane views, suggesting that each flow feature essentially occupies a distinct fraction of the channel height.

Figure 4:
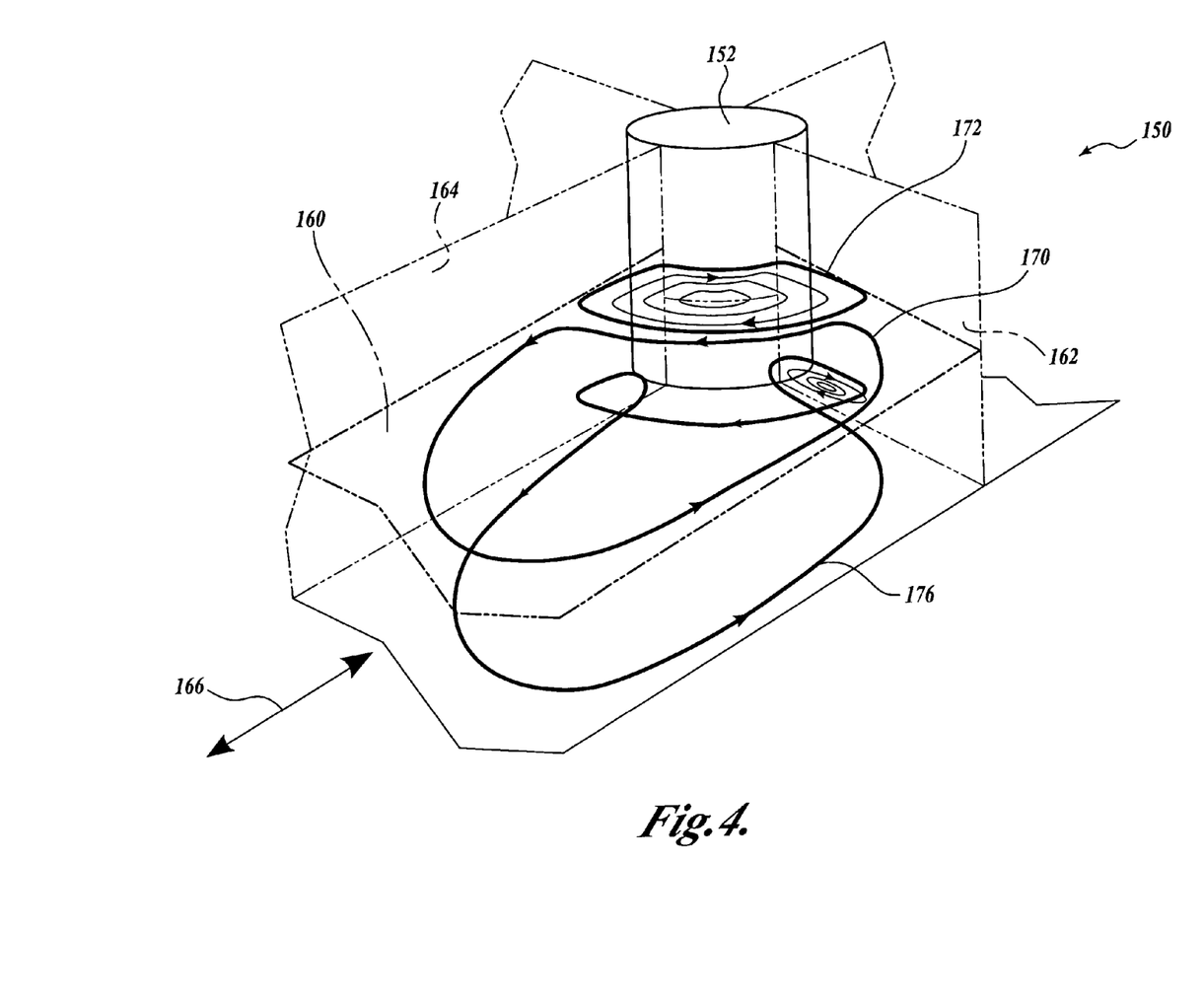
FIG. 4 is a close-up view of a portion of a quadrant of the fluid channel near the cylinder shown in FIG. 3, showing representative two-dimensional and three-dimensional flow streams.

The overall flow structure is shown schematically by representative streamlines in FIG. 4, which shows a portion of one quadrant of the flow channel 150 near the cylinder 152, including schematic representations of streamlines indicating the mid-plane outer flow far-field eddies 170 and near field 2-D eddies 172 discussed above. The near-field 2-D eddies 172 occupy a portion of the channel height and induce the outer flow 170. The 3-D streaming near the intersection of the cylinder 152 and channel walls extends far into the fluid channel 150 where the circulation direction agrees across the entire channel height (symmetric upper flow is not shown, for clarity).

Some portion of the cylinder 152, therefore, is surrounded by 2-D eddies 172 bounded by a well formed dividing streamline, while the cylinder ends 152 are in contact with fluid drawn from far out in the fluid channel 150. Suppression of the 3-D flow encourages formation of an isolated fluid volume near the cylinder 152, while dominance of the 3-D flow encourages mixing of fluid near the cylinder 152. Design of microscale eddies for different applications relies on understanding the scaling of the flow along the cylinder 152 length.

The extent of the 3-D flow within the channel height was quantified by measurement of the distinct 3-D eddy 176 formed near the channel walls in the transverse vertical plane 162.

Distinct recirculating 2-D eddies 172 are generated within a well-organized three-dimensional streaming flow 176 generated by boundary layers at the cylinder 152 surface and the channel walls. The dominant features of channel-based low-intensity steady streaming around a cylinder 152 are two essentially independent streaming flows the 2-D eddies 172 formed around the cylinder 152 far from the channel walls, and a distinct recirculating flow 176 generated within the wall boundary layer. In our experiments, the size of the three-dimensional recirculating flow is directly proportional to the Stokes layer thickness independent of cylinder 152 size, at least over a range of cylinder sizes. Between these two independent flows there is a transition region that is consistent with competing steady streaming flows, although the origin of the scaling is not entirely clear.

The scaling analysis suggests that flow features may be independently tuned to design steady streaming eddies for channel-based microfluidic applications. When the 2-D eddy largely fills the channel height, most of the cylinder is surrounded by fluid trapped within the dividing streamline. In our previous work, long 2-D eddies (i.e., using a long cylinder) formed distinct chemical domains adjacent to the cylinder with quantitative diffusion of reagents occurring across the dividing streamline. Conversely, as the 2-D eddy is increasingly displaced in the channel height, an increasing portion of the cylinder is in contact with fluid that recirculates far into the channel 150. This extended flow encourages cross-channel convection typically pursued to improve mixing rates in microfluidic channel devices.

Microscale steady streaming eddies also offer a unique approach to controlling microscopic objects carried by the fluid. For example, experiments show that suspended microspheres are drawn toward the cylinder where they are trapped within a 2-D eddy 172. The scaling described herein and in the incorporated provisional application has allowed design of 2-D eddies 172 that form pockets in which objects can be fluid-dynamically trapped. Trapping refers to the ability to move an object in the fluid into a 2-D eddy 172 and retain it there. A trapped particle may oscillate about a specific position within the eddy or may circulate within the eddy.

It will be appreciated by the person of skill in the art that, although the results presented here are for the prototypic streaming flow formed around a cylinder 152, the flow structure and scaling will help in design of microscale eddies within more diverse geometries. Overall, the microscale eddies generated using low-intensity sound waves offer a fundamentally different option for controlling fluids in microfluidic systems.

Dynamic measurement of single-cell physiology and biochemistry requires a means to trap and hold cells without perturbing behavior. Established single-cell trapping methods include dielectrophoretic (DEP) traps and laser tweezers, which rely on external fields to generate forces on cells. We describe gentle traps created using only fluid flow and demonstrate trapping of single microspheres ($\approx$50 μm diameter) and motile phytoplankton cells (*Prorocentrum micans*). Low-intensity oscillation (low audible frequency) in a channel containing a fixed cylinder (radius=125 μm) creates four steady streaming eddies, which are controlled by the oscillation frequency and amplitude as described by well-established theory. Experiments show that eddies collect objects from the channel and trap them at predictable positions in three dimensions.

To verify the trapping ability of the present invention, an experimental setup was used similar to that described previously and shown in FIG. 2 and consisted of a flow system including a channel flow cell 100 containing a small, fixed cylinder 152, a piezoelectric driver assembly 130 for oscillating the channel fluid, and a flow visualization system. Trapping experiments were conducted using polystyrene spheres, and using motile phytoplankton *Prorocentrum micans*. Polystyrene spheres were suspended in a mixture of $H_2O$ and $D_2O$ (approximately 50% mixture) to make the fluid slightly less dense then the microspheres (i.e., the microspheres were more dense than the fluid). Axemic *P. micans* samples were used in their growth medium without treatment.

All experiments were conducted at room temperature.

The measured trap location is controlled by the frequency, which in one example is varied between 250 and 1,000 Hz, and is in good agreement with the eddy center calculated from theory. The eddy center changes location when the oscillation frequency is changed. In experiments, changing the oscillation frequency moved a trapped particle to a new location. The trap strength is related to the oscillation amplitude, and can be determined using measured motility forces of trapped *P. micans*. Trap strength is easily adjustable via the oscillation amplitude and measured forces up to 50 pN are comparable to DEP traps and laser tweezers. Even though theory used to describe the two-dimensional steady streaming uses an assumption of low oscillation amplitude (i.e., $\epsilon \ll 1$), the trapping is not limited to low oscillation amplitude. Further, the flow strength is affected by the oscillation frequency, which could also be used to control the trap strength. Estimated shear stress of 1 N/m² for strong traps is comparable to arterial shear stresses and three orders-of-magnitude below viability limits for *e. coli* and yeast. Trapped objects are completely surrounded by fluid and eddy traps are easily applicable to any typical cell medium. It is known that steady streaming eddies can be created in any number of channel and/or obstacle geometries and it is contemplated by the present invention that the trapping ability described here can readily be achieved utilizing other such geometries for varied trapping applications. In all, these hydrodynamic traps offer a gentle and fundamentally different method for trapping single cells.

Figure 5:
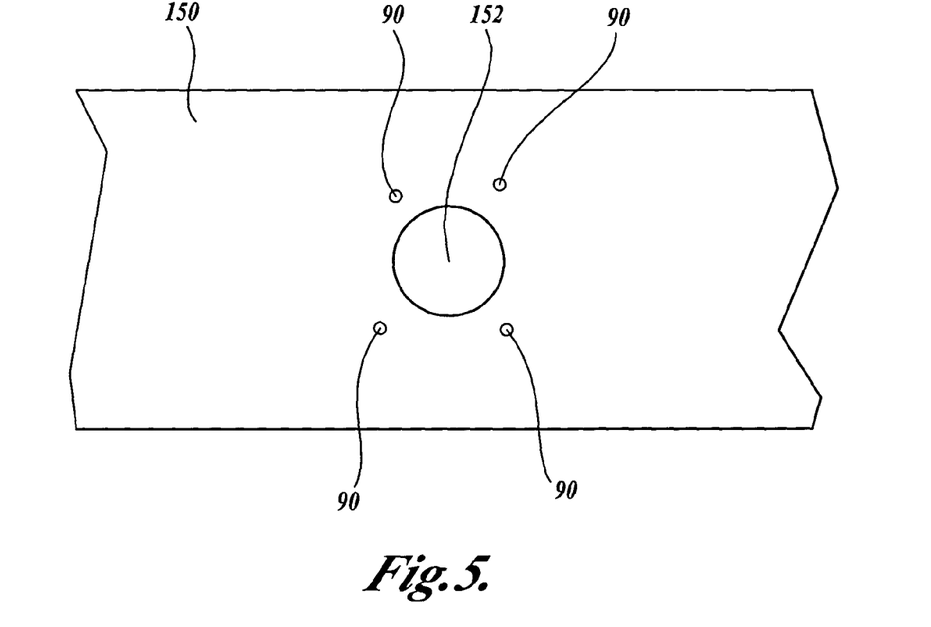
FIG. 5 is a sketch of a plan view of a portion of the fluid channel shown in FIG. 3, indicating the fluid-dynamic trapping of spheres.

FIG. 5 shows diagramatically the fluid-dynamic trapping of microspheres or other objects by four eddies disposed symmetrically about the cylinder 152, as described above. In an experimental apparatus similar to that shown in FIG. 2, for example, and utilizing an oscillation frequency of about $\omega=300$ Hz, particles 90 comprising microspheres having a diameter of about 50 microns were observed being moved by the fluid flow into the eddy trapping regions disposed about the cylinder 152. In particular, the three-dimensional eddies (176 in FIG. 4) near the junction of the channel walls and the cylinder 152 tend to move the particles 90 toward the 2-D eddies. In particular, the particles 90 were transported into the 2-D eddy portion of the flow field, near the horizontal mid-plane 160 (FIG. 3), where the particles 90 were fluid-dynamically retained. It will be appreciated by persons of skill in the art from very straightforward design considerations that the 2-D eddy portion of the flow field may be narrow, such that the vertical position of the trapped particles 90 are well defined, thereby facilitating imaging, observing, or other manipulation of the particles 90. It will also be appreciated that the system is able to trap particles having a density greater than the fluid, the same density as the fluid, or a density less than the surrounding fluid. The particular path taken by a particle 90 to the eddy will depend on many factors, including the particle's particular size, density, and initial conditions, but the final position of at least some of the particles 90 is well defined to one of the four 2-D eddies formed about the cylinder 152.

By the appropriate selection of the geometry and oscillation parameters, particles in a range of sizes are drawn across flow streamlines to enter the trap in the 2-D eddies. Smaller particles may simply trace the fluid flow without being trapped; in fact, small particles are used to visualize flow due in part to their lack of movement across streamlines. In the experimental conditions described in the incorporated provisional application, the system was tested for trapping of spheres down to roughly 20 µm diameter, and trap strength qualitatively decreased with object size (i.e., more orbits before settling). Objects somewhat smaller than 20 microns were moved initially toward the eddy center, and they orbited within the eddy.

Despite different initial locations within the channel and different collection pathways, all spheres were ultimately positioned within the 2-D eddies and in the focal plane (i.e., channel horizontal mid-plane). It should be appreciated that the trap is located within a flow symmetry plane that has no fluid flow in the axial direction. The controlled axial positioning resulted from limiting the trapping eddies to a narrow region based on the frequency dependence for this three-dimensional streaming flow. The spheres remain trapped indefinitely and traps created under easily attainable conditions are tolerant of major disruptions such as the occasional collision with a fast-rising bubble. This flow-based approach to trapping is capable of positioning objects without external force fields or contact with surfaces. Trapped objects are completely surrounded by fluid and the flow can be controlled through the oscillation conditions.

The eddy size is controlled by the dimensionless frequency, $M^2 = a^2 \omega/\nu$, where a is the cylinder radius, $\omega$ is the dimensional oscillation frequency, and $\nu$ is the fluid kinematic viscosity. Therefore, for a given flow system, such as flow system 100 shown in FIG. 2, the eddy size may be controlled by appropriate selection of working fluid (i.e., the kinematic viscosity) and the oscillation frequency.

As with conventional micro-trapping systems discussed above, in the present system multiple objects may compete for trapping positions. In DEP systems, overpopulated traps can to some extent be cleared by bulk flow. In some experiments we used net flow through the channel to deliver objects to the 2-D eddies 172 by manually controlling a syringe (not shown) fluidly attached to the inlet port 104. We found that objects remained trapped even under moderate net flow through the channel, while large net flow rates removed objects from the traps. In the eddy traps disclosed herein, competition between two or more objects of comparable size typically leads to precessing about the trapping location, while a sufficiently large object wins the trap when size differs. The eddy size may be reduced by increasing the frequency to discourage additional collection or to "crowd out" unwanted objects. This effect of eddy size on exclusion may be an important step in single object trapping that requires further work, but it also suggests the possibility of size-based separations.

The present invention allows simple prediction of the trapping location based on well-known theory. Further, theory correctly describes the flow scaling for fluids as diverse as gases and viscous liquids, making this approach easily applicable to any typical cell medium.

A more challenging goal is the trapping of nonspherical motile cells. *Prorocentrum micans* is a motile photosynthetic dinoflagellate with a strongly-flattened, tear-drop shape (20-50 µm wide, 35-70 µm long), and it is propelled in a corkscrew motion by a pair of spinning flagella at the narrow end of the long axis, the spinning flagella generating a motile force that propels the cell within the fluid.

Figure 6:
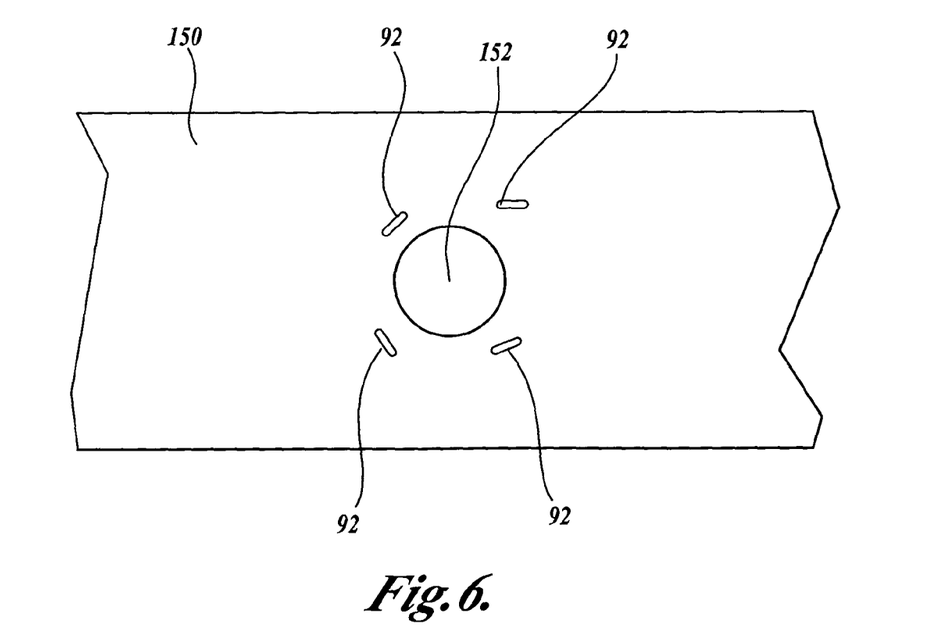
FIG. 6 is a sketch of a plan view of a portion of the fluid channel shown in FIG. 3, indicating the fluid-dynamic trapping of non-spherical motile cells.

As indicated schematically in FIG. 6, the present invention has been used successfully for the trapping of motile *P. micans* cells 92. Without low-intensity streaming flow, the *P. micans* swim freely in the test fluid at about V=150 µm/s. When the oscillation was turned on to induce steady streaming, at $M^2=25$, the motile *P. Micans* cells 92 were quickly pulled toward the 2-D eddies generated about the cylinder 152 and drawn into an orbit that converged to the trapping location. Unlike the microspheres 90 shown in FIG. 5, the *P. micans* proceeded along a somewhat-scrambled path after initial trapping, indicating continued swimming efforts that led to partial escape and retrapping. This movement is expected for any trapping method that applies a finite force to counteract motility forces. Non-motile (i.e., dead) *P. micans* were trapped much more stabley at the eddy center, with the expected rotation about a fixed axis, and they tended to orient with their flat dimension lying in the focal plane. The ability to overcome motile forces suggests significant trapping force, while trapping did not appear to harm the *P. micans* 92.

From the perspective of a trapped cell, the environment is not much different from hat experienced in more conventional fluid flow. In particular, the low-intensity steady streaming flow used to create eddy traps introduces shear stresses that can be estimated from the well-known flow.

While the oscillation amplitude provides clear control over the trap strength, the relationship does not explain the origin of trapping forces. Recirculating flows have been shown to trap light objects such as bubbles, while experiments and theory often describe ejection of heavy objects due to centrifugal forces. The centrifugal effect of recirculating cavity flow driven by a large steady flow rate through a channel has been demonstrated for density-based microsphere separations. The microspheres 90 and *P. micans* 92 trapped in the experiments discussed above were more dense than the fluids used, as verified by settling in stagnant solution. The force responsible for trapping heavy objects shown here dominates centrifugal forces that would otherwise lead to ejection.

The balance between centrifugal and inertial lift forces in microscale cavities has been shown to accumulate microspheres in orbiting rings. Inertial lift forces require finite Reynolds number. Theory and experiments include descriptions of objects in vortices and in oscillating flows; however, these are generally limited in scope and geometry. In this flow, the oscillating and steady flow components differ by a factor of $\epsilon$, and velocity gradients in the stronger oscillating flow are expected to be responsible for trapping forces. It is likely that lift generated during oscillation is responsible for trapping forces, but confident description of the trapping forces and the origin of axial positioning will require a careful look at velocity gradients in the flow and established particle theory.

The chosen geometry for steady streaming flow described here benefits from availability of well-established theory, numerical simulations for the two-dimensional flow, and an experimental description of the three-dimensional flow that will aid identification of trapping forces and downsizing traps for smaller cells. The well-established scaling is generally applicable to different fluids and properly accounts for geometry, oscillation parameters, and fluid viscosity. It is known in the art that steady streaming eddies can be created in any number of channel geometries wherein the channel has one or more channel features that cause deviation from unidirectional flow in the channel. The trapping concept disclosed in the present invention can be readily extended to designs for varied trapping applications. For example, we have used bubbles inside the channel as obstructions that create trapping eddies, and we have used asymmetric protrusions from the channel wall to create eddies. Quantitative features vary with geometry of the obstruction; however, the steady streaming flow around any object has the potential to create traps. It is contemplated that obstructions can include any feature that requires the oscillating fluid to turn, including bluff bodies of different shapes, protrusions from channel walls, cavities in channel walls, movable features such as bubbles or membranes, and expansions or contractions of the channel. These features may be symmetric or asymmetric.

Quantitative measurements of the steady streaming and trapping were performed without net flow through the channel, however we used net flow in experiments to deliver particles to the area of the channel near the obstruction and to manipulate trapped particles. For example, we used large net flow through the channel to remove trapped objects or to displace one or more particles from traps that contained multiple particles. For example, in the plankton experiments, in some experiments we preferred to observe a single plankton cell in a single eddy and net flow from a syringe connected to the channel, manipulated using quick pulses, and could be used to remove unwanted cells while retaining a cell in an eddy. Also, when we wanted to deliver a particle to a trap, we could use net flow through the channel superimposed on the fluid oscillation to urge a particle into the vicinity of an eddy, aiding the eddy in trapping. From these routine experimental procedures, it was clear that particles could remain trapped even in the presence of net flow through the channel. The ability to trap in the presence of net flow through the channel represents a competition between the strength of steady streaming flow driven by the oscillation and the convective strength of the net flow through the channel.

Although the trapping flow system 100 shown in FIG. 2 has a single cylinder 152 disposed in the fluid channel 150 and may be utilized for fluid-dynamically trapping from one to several particles such as cells at a time, it is also contemplated that a plurality of cylinders 152 or other flow perturbances may be used to trap a larger number of particles.

Figure 7:
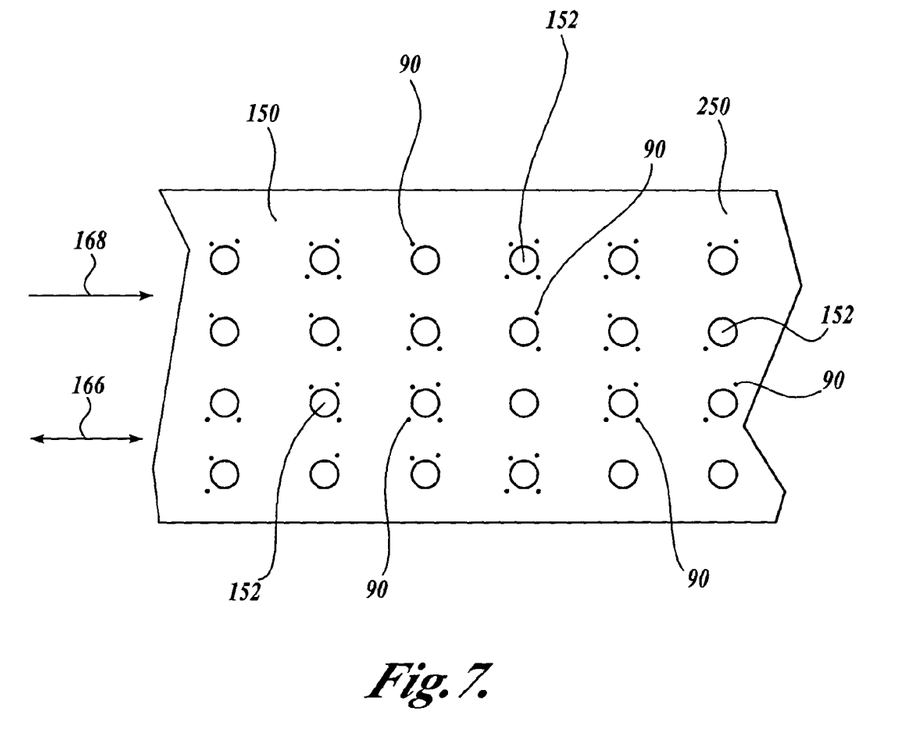
FIG. 7 is a sketch of a plan view of a fluid channel for an alternative embodiment of the present invention, having a plurality of cylinders and a through flow.

FIG. 7 shows the fluid channel 150, but having a larger number of cylinders (20 shown) 152 arranged in a regular array through a portion of the fluid channel 150. As indicated by the double-headed arrow 166, an oscillatory boundary condition is applied to the fluid channel 150 to produce a low-intensity streaming flow about the cylinders 152, producing small eddies near each cylinder 152. A net through flow, or net flow, is also applied, as indicated by the single-headed arrow 168. As described above, the fluid oscillation 166 parameters, working fluid and/or channel dimensions, are selected such that the eddies formed in the low-intensity steady streaming flow field will selectively trap particles 90 in the 2-D eddies generated by the streaming flow. The fluid channel 150, of course, may include an arbitrary number of cylinders 152 to achieve a desired trapping capacity. It is also contemplated that the trapping capacity of the fluid channel 150 may be increased by increasing the height of the fluid channel 150 and correspondingly increasing the length of the cylinders 152, whether one cylinder or multiple cylinders are located in the channel. For an otherwise equivalent low-intensity steady streaming flow field, a longer cylinder 152 will produce a wider region of 2-D eddies, disposed away from the three-dimensional flow associated with the junction of the cylinder 152 and the wall. As discussed above, appropriately formed 2-D eddies have been found to trap the particles 90, therefore expanding the extent of these 2-D regions will provide additional particle trapping capacity. Multiple cylinders 152 could, of course, be designed to create many individual traps for single particles, as described above for a single cylinders 152. Further, multiple obstructions of alternative geometries, as noted above, could be used rather than (or in addition to) cylinders 152.

It will be appreciated that the channel may be utilized for increasing the concentration of particles 90 in a fluid, for example, by trapping the particles 90 in the eddies in a through flow system and periodically stopping the flow and retrieving the contents of the fluid channel 150. Concentration could also be performed in a batch process by loading a fluid containing particles 90, trapping the particles 90 in eddies, and periodically removing the concentrated particles from the system. Similarly, the present invention may be used as a filter for a fluid stream by running the fluid stream through the fluid channel 150 to remove the particles 90. Filtering could also be performed in a batch process by loading a fluid containing particles, trapping particles 90 in eddies, and removing the particle-depleted fluid surrounding the eddies. It will be appreciated that such a filter can be readily flushed or cleaned by running a fluid through the fluid channel without the low-intensity steady streaming, or by using a sufficiently large net flow rate through the channel to displace all trapped particles.

Figure 8:
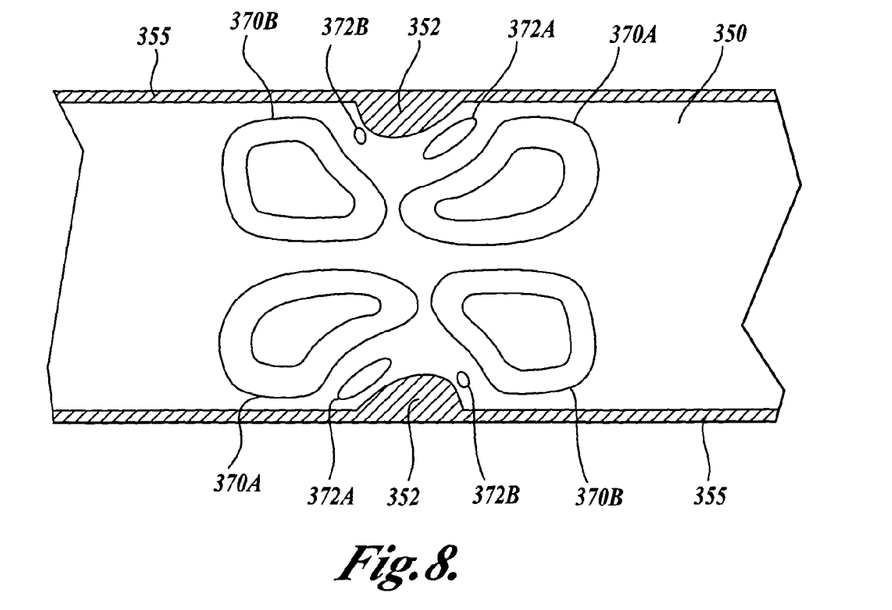
FIG. 8 is a sketch of a plan view of a fluid channel for an alternative embodiment of the present invention, having a plurality of wall obstructions that generate eddies.

FIG. 8 shows a fluid channel 350 that is similar to the previous embodiments, except that the flow obstructions are asymmetric protrusions 352 extending into the channel 350 from either side of the channel walls 355. When a low-intensity streaming flow is generated, as discussed above, inner 2-D eddies 372A and 372B form at the horizontal mid-plane near the protrusions 352, and outer 2-D eddies 370A and 370B form away from the protrusions. By the selection of appropriate fluid viscosity, channel geometry, and vibrational parameters, analogous to the discussion above, the inner eddies 372A and 372B may be selectively generated to produce a desired trapping force. Because of the asymmetry of the protrusions 352, the inner eddies 372A and 372B on either side of the protrusion 352 are not the same for example, the eddies 372A are larger in extent than the eddies 372B. Such a geometry may be preferred, for example, when fewer trapping eddies are desired (for example, to reduce the locations where a particle may be trapped in the channel). Of course, symmetric protrusions may alternatively be employed and/or the protrusions may be combined with other obstructions in the channel, such as the cylinders 152 shown in FIG. 7.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for fluid-dynamically trapping one or more particles in a fluid, the method comprising the steps of:
   providing a channel with at least one channel feature that causes deviation from unidirectional flow;
   filling the channel with a fluid containing a plurality of particles having a diameter of at least 20 μm; and
   oscillating a boundary of the fluid at a frequency and an amplitude to generate a low-intensity steady streaming flow such that eddies are generated at fixed locations in the fluid, wherein the low-intensity steady streaming is driven by time-averaged Reynolds stresses resulting from inertial terms in the boundary layer in oscillating flow;
   wherein the fluid exerts a force that moves at least one of the plurality of particles into one of the eddies.

2. The method of claim 1, wherein the eddies are created by a conservative effect that does not require compression of the fluid.

3. The method of claim 1, wherein at least one of the eddies fluid dynamically retains at least one of the plurality of particles.

4. The method of claim 1, wherein some of the plurality of particles become concentrated within the eddies relative to the fluid in the channel away from the eddies.

5. The method of claim 1, wherein the channel feature is an obstruction in the channel.

6. The method of claim 5, wherein the channel includes a pair of oppositely disposed sidewalls, and the obstruction is disposed between the sidewalls and spaced apart from the sidewalls.

7. The method of claim 6, wherein the obstruction is a cylinder.

8. The method of claim 5, wherein the channel includes a pair of oppositely disposed sidewalls and the obstruction is a protrusion from one of the sidewalls.

9. The method of claim 1, wherein the channel further comprises at least one inlet port and at least one outlet port, and wherein there is a net fluid flow through the channel.

10. The method of claim 1, wherein the plurality of particles contained in the fluid are cells.

11. The method of claim 10, wherein the cells are motile and capable of exerting a motile force, and wherein the eddies generate a trapping force that is greater than the motile force of the cells.

12. The method of claim 1, wherein at least some of the plurality of particles contained in the fluid are denser than the fluid.

13. The method of claim 1, wherein the eddies generate a trapping force that is controlled by the oscillation amplitude.

14. The method of claim 1, wherein the size of the eddies is controlled by the oscillation frequency.

15. The method of claim 1, wherein the channel includes a plurality of channel features, with at least one eddy associated with each channel feature.

16. The method of claim 15, wherein at least one of the channel features is a cylindrical obstruction.

17. The method of claim 15, wherein the channel further comprises an inlet port and an outlet port, and wherein there is a net fluid flow through the channel.

18. The method of claim 1, further comprising the step of recovering the plurality of particles in the eddy.

19. A method of isolating cells at positions within a fluid, the method comprising:
   immersing at least one cell in a fluid;
   providing a channel having at least one channel feature that causes deviation from unidirectional flow;
   filling the channel with the fluid; and
   oscillating a boundary of the fluid at a frequency and an amplitude to generate a low-intensity steady streaming flow in the fluid such that an eddy is generated in the fluid, and fluid dynamically trapping at least one cell in the eddy, wherein the low-intensity steady streaming is driven by time-averaged Reynolds stresses resulting from inertial terms in the boundary layer in oscillating flow.

20. The method of claim 19, wherein the at least one channel feature is a cylinder.

21. The method of claim 19, wherein the at least one channel feature is a protrusion from a channel wall.

22. The method of claim 19, wherein the at least one cell is denser than the fluid.

23. The method of claim 19, wherein the at least one cell is motile and capable of generating a motile force, and wherein the eddy produces a trapping force that is greater than the motile force of the cell.

24. The method of claim 19, wherein the channel further comprises at least one inlet port and at least one outlet port, and wherein there is a net fluid flow through the channel.

25. The method of claim 19, wherein the eddy produces a trapping force that is controlled by the oscillation amplitude.

26. The method of claim 19, wherein the size of the eddy is controlled by the oscillation frequency.

27. The method of claim 19, wherein the at least one channel feature comprises a plurality of channel features, and wherein the low-intensity steady streaming generates at least one eddy associated with each channel feature.

28. The method of claim 27, wherein plurality of channel features are cylinders.

29. The method of claim 27, wherein the channel further comprises at least one inlet port and at least one outlet port, and wherein there is a net fluid flow through the channel.

30. The method of claim 19, further comprising the step of recovering the cell trapped in the eddy.

* * * * *

UNITED STATES PATENT AND TRADEMARK OFFICE
CERTIFICATE OF CORRECTION

| | | Page 1 of 1 |
|---|---|---|
| PATENT NO. | : 7,803,599 B2 | |
| APPLICATION NO. | : 11/038454 | |
| DATED | : September 28, 2010 | |
| INVENTOR(S) | : B. R. Lutz et al. | |

It is certified that error appears in the above-identified patent and that said Letters Patent is hereby corrected as shown below:

COLUMN  LINE  ERROR
1  13  "This invention was made with U.S. Government support under Grant No. 9872385 awarded by the National Science Foundation (NSF). The U.S. Government has certain rights in the invention."

should read

--This invention was made with U.S. Government support under Grant 9872385 awarded by the National Science Foundation (NSF) and Grant 1P50HG02360 awarded by National Institutes of Health (NIH). The U.S. Government has certain rights in the invention.--

Signed and Sealed this
Eighth Day of February, 2011

David J. Kappos
*Director of the United States Patent and Trademark Office*